United States Patent [19]

Berger et al.

[11] Patent Number: 5,009,386
[45] Date of Patent: Apr. 23, 1991

[54] PIPE HANGER AND SUPPORT

[76] Inventors: Richard C. Berger, Off Split Rock Rd., Syosset, N.Y. 11791; Paul L. Berger, 28 Moss La., Jericho, N.Y. 11753

[21] Appl. No.: 360,072

[22] Filed: Jun. 1, 1989

[51] Int. Cl.⁵ ............................................. F16M 13/00
[52] U.S. Cl. ...................................... 248/613; 248/59; 248/62
[58] Field of Search ...................... 248/613, 58, 59, 62

[56] References Cited

U.S. PATENT DOCUMENTS

| | | | |
|---|---|---|---|
| 2,365,710 | 12/1944 | Loepsinger | 248/613 X |
| 2,714,497 | 8/1955 | Denis | 248/62 |
| 3,048,359 | 8/1962 | Kohler | 248/613 X |
| 4,006,873 | 2/1977 | Berger | 248/58 X |
| 4,083,522 | 4/1978 | Vandersip | 248/613 |
| 4,146,203 | 3/1979 | Williams | 248/62 |
| 4,238,102 | 12/1980 | Salter | 248/613 X |

FOREIGN PATENT DOCUMENTS 956620  10/1974  Canada ................................. 248/613

Primary Examiner—David L. Talbott

[57] ABSTRACT

A spring support for a clevis or a pipe in which a main central bolt and two additional auxiliary bolts on opposite sides thereof are used to prestress the spring, wherein tightening of nuts on the auxiliary bolts raise an operative member causing an initial compression of the spring, and subsequent tightening of the nut on the main bolt completes the compression of the spring and also relieves the spring pressure on the auxiliary bolts to thereby facilitate their removal, both of the aforesaid spring compressions being achieved without any change in the horizontal supported position of the pipe.

3 Claims, 2 Drawing Sheets

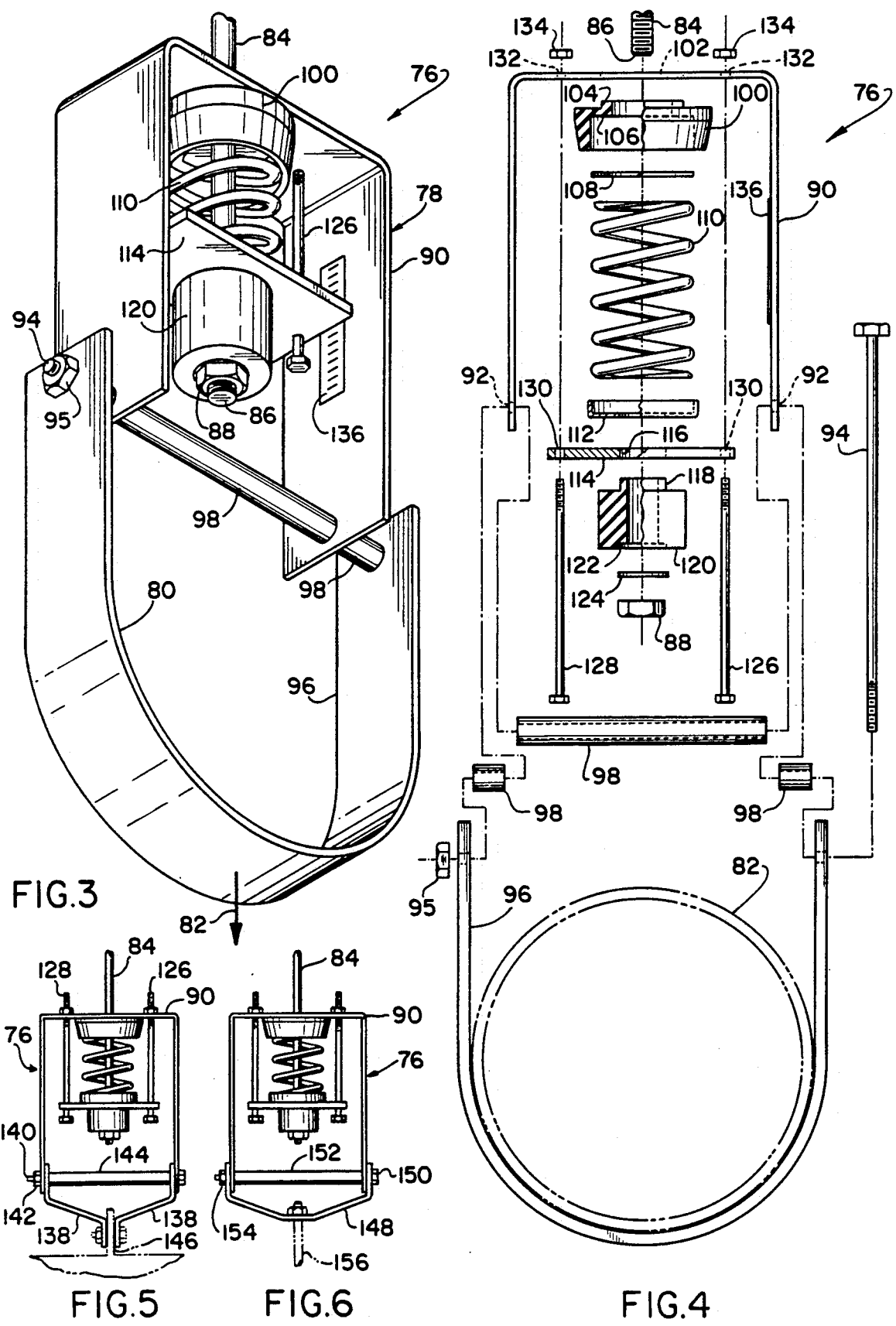

PIPE HANGER AND SUPPORT

The present invention relates to improvements in vibration control hangers for pipes installed in buildings, and more particularly to a hanger in which the spring conventionally used therein can be prestressed without adversely effecting the horizontally supported position of the pipe.

As generally understood from trade literature, such as "Hanger Development Product Data" H-610-2 Bulletin of Mason Industries, Inc. of Floral Park, N.Y., there are a variety of so-called hangers which, in practice, are adopted to serve as overhead spaced supports for fluid pipes installed in office buildings, factories and similar structures. The usual installation requirement is that the pipe be supported in a horizontal orientation or condition which, in practice, is provided the pipe at the time of installation when it is empty. This horizontal orientation however, is required to be maintained when the pipe is subsequently used and water or other fluid flows therethrough and adds a load condition, i.e., the weight of the flowing water, and other hydraulic conditions, such as surges, vibration, noise, etc., to the post-installation circumstances.

Hangers of the type above referred to, thus employ a spring which can be prestressed to take into account the load condition to which the empty pipe will subsequently be subjected, so that there is no significant displacement in the installed position of the empty and "loaded" pipe. While these hangers currently in use, and as illustrated and described in the noted trade literature, have provision for the prestressing of the spring without significant changes in the pipe position, their spring-prestressing operating mode is not entirely without effect on the pipe position and, moreover, is unnecessarily complicating in requiring changes in the threaded position of engagement of numerous nuts on the various threaded bolts used in these prior art hangers.

Broadly, it is an object of the present invention to provide a pipe hanger overcoming the foregoing and other shortcomings of the prior art. More particularly, it is an object to provide an improved pipe hanger in which the improvements allow for spring prestressing at the factory, if desired, and subsequently making adjustments thereto at the installation site, all without any change in the pipe horizontally supported position and with an optimum minimum adjustment required in co-operating nuts and bolts, all as will be explained in detail subsequently herein.

The description of the invention which follows, together with the accompanying drawings should not be construed as limiting the invention to the examples shown and described because those skilled in the art to which this invention appertains will be able to devise other forms thereof within the ambit of the appended claims.

FIG. 3 is a perspective view, similar to FIG. 1 but of the within inventive pipe hanger;

FIG. 4 is a view, similar to FIG. 2, but again of the within inventive hanger; and FIGS. 5 and 6 are smaller scale front elevational views of other embodiments of the present invention.

Figures 1, 2:
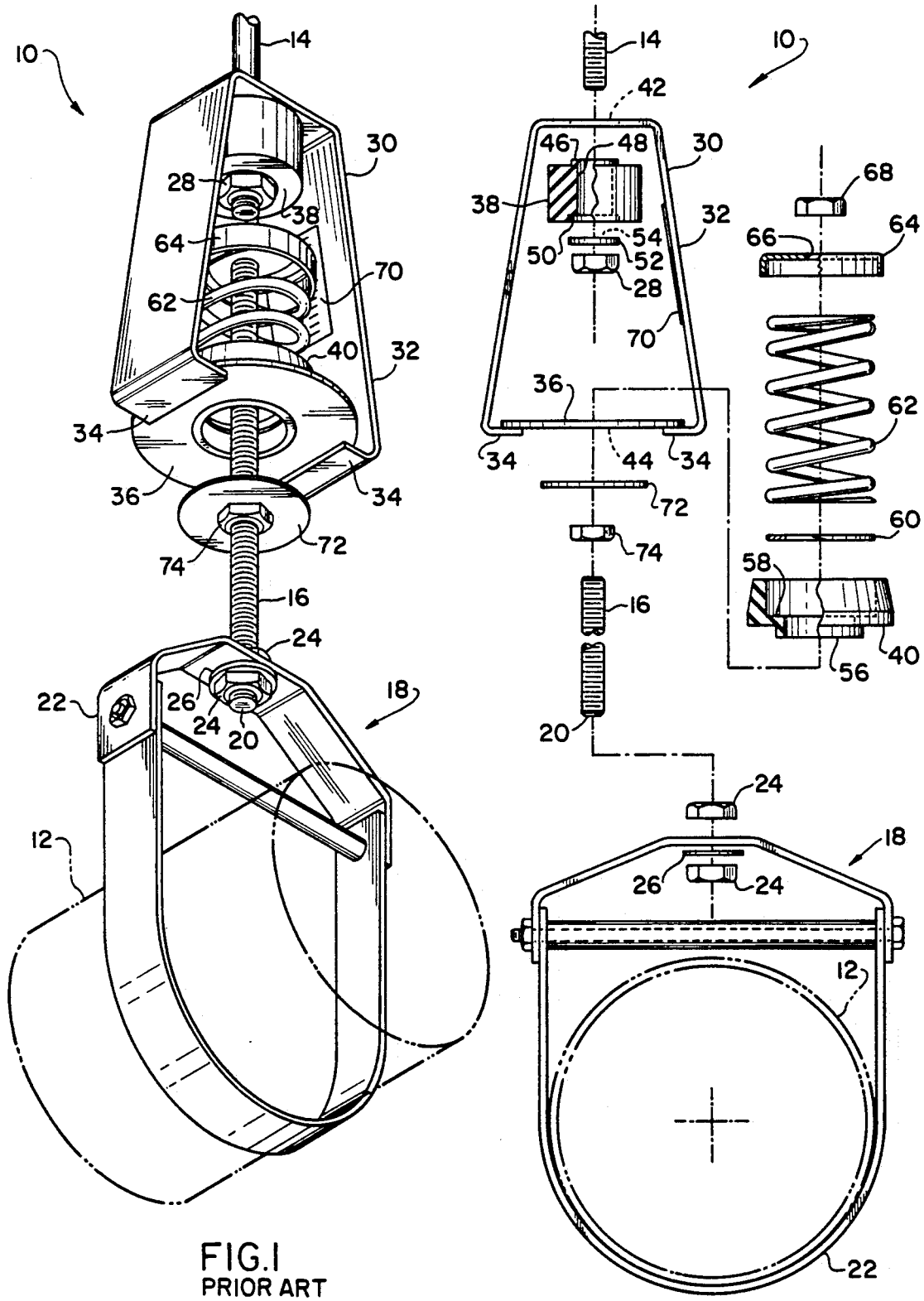
FIG. 1 is a perspective view, for comparison with the within inventive pipe hanger, of a prior art pipe hanger shown connected to a pipe clevis.
FIG. 2 is a front elevational view of the prior art device of FIG. 1 in disassembled relation.

In the prior art circumstances depicted in FIGS. 1 and 2, hanger 10 is shown as representative of the many types of support devices currently used in heavy construction. Ceilings, electrical conduits, piping systems, air conditioning ductwork and associated equipment are, in practice, suspended from building structural members. In most cases, these systems are connected to motors, pumps, fans or other noise and vibration generators. Often the systems are subject to weight, temperature and structural changes that also must be accommodated. The suspension hangers employed in the circumstances and under the conditions noted must therefore not only support the load and be easy to install, but also must dampen out job site noise and vibration, and adjust to structural changes due to temperature and load variations. Currently meeting these requirements is the prior art device 10 now to be described in conjunction with FIGS. 1 and 2.

When load 12, in this case assumed to be a section of pipe, is to be suspended from the building structure and is subject to the aforementioned conditions, hanger assembly 10 can be installed between the upper support rod 14 and the lower support rod 16. Lower support rod 16 usually consists of a relatively short piece of appropriately sized threaded rod to which the load support means 18 is connected at the rod lower end 20. In the case of a standard pipe, the support includes a clevis assembly 22. Clevis 22 is assembled about pipe load 12 and is connected to rod 16 by nuts 24 and washer 26. Upper rod 14 usually has its upper and lower ends threaded at the site of installation using a supply length of stock rod which is cut to length. The upper end of rod 14 is fitted to an appropriate anchor means (not shown), while the lower end is engaged in hanger 10 by nut 28.

As is generally understood, hanger 10 has a main frame 30 which is made by bending a flat steel strip 32 into an inverted U shape with return bends 34 on the lower end, to which washer 36 is welded. Upper and lower isolator elements 38 and 40 are made of Neoprene or other rubberlike material which is effective to dampen noise and mechanical vibrations within the system and at the same time allow for some vertical deflection while under varying load. Cylindrical isolator 38 has a raised lip 46 which, as best seen in FIG. 2, seats within bore 42 and is provided with a throughbore 48. The lower end of the throughbore 48 of isolator 38 is provided with a counterbore 50 to receive therein a washer 52. At installation, assembly of the prior art hanger 10 contemplates the lower end of rod 14 being passed through bore 42, the throughbore 48 of isolator 38, the hole 54 of washer 52, and being fastened at its exposed depending end with nut 28.

The other or lower isolator 40 also has a lip 56 which positions it coaxially within the main frame when seated in hole 44 of the washer 36. A counterbored seat 58 in isolator 40 is provided to receive washer 60 which is the lower support for a spring 62. Spring 62 is provided with flattened and ground end helical turns for facilitated seating against washer 60 as just noted and, at its upper end in a cup washer 64 having a central hole 66 which is utilized to center lower rod 16 when it is projected upwardly within spring 62 and secured by nut 68.

When only a minimum amount of hanger deflection is contemplated after installation, the device 10 may be prestressed according to the positions of movement of a deflection scale 70 displayed for convenient reference inside the hanger frame 30, by use of a washer 72 and nut 74. As seen in FIG. 1, spring 62 can be prestressed or compressed by turning nut 74 about rod 16 clockwise against washer 72 which, in effect, draws cup 64 down along rod 16 compressing spring 62. The relative position of movement of cup washer 64 in relation to indicia on scale 70 indicates to what load level the device 10 has been prestressed. Prestressing can also be accomplished off site at the factory once the lower rod 16 is in place. Prestressing is particularly advantageous in piping installations where the pipe required is to be installed level, but at installation is empty and only afterwards then is filled with fluid to bring the total load just above the prestressed level as shown in FIG. 1. Installations made with prestressed hangers allow for a minimum of deflection adjustments to be made after the full load has been applied to the system.

However, a characteristic aspect of the prior art hanger 10 which it is significant to note is that invariably job site conditions require adjustment in the prestressing of spring 62 that was done at the factory. That is, after field assembly and final loading the operating position of prior art prestressed hangers such as exemplified by hanger 10 may require a detail positioning by the adjusting vertically of nuts 24, 28, 68 and 88. While all nuts used are of the self locking type or equivalent and thus minimize the effort of this adjustment at the job site, it nevertheless is still an undesirable chore and inconvenience because of the number of threaded adjustments that must be made in the noted nuts 24, 28, 68 and 88. An even more significant prior art shortcoming is that the prestressing adjustments result in unavoidable adjustments or changes in the suspended position of the pipe load, thus complicating providing the supported pipe with a desired horizontal orientation.

For comparison with the prior art hanger 10 of FIGS. 1 and 2, reference should be made to the within improved inventive hanger 76 as shown in FIGS. 3 and 4 which is particularly noteworthy in the simplified manner in which the spring thereof can be prestressed at the factory and subsequently adjusted as needed at the job site, all as will now be described in detail.

As with the prior art hanger 10, the improved hanger 76 hereof is intended to support a pipe load 82 by a depending rod 84 after the threaded end 86 thereof has been inserted through the device 76 and secured by nut 88.

Suspension 78 has an inverted U shaped frame member 90 bent from a flat steel strip which has horizontally aligned holes 92 adjacent the lower ends of its legs for a bolt 94 suspended therebetween. Bolt 94 with end nuts 95 is used to support load clevis 80 which is formed of a saddle strap 96 about the pipe load 82 and three spacer sleeves 98 disposed about the rod 94 and within the holes 92. That is, sleeves 98 cooperate with strap 96 and bolt 94 to maintain load 82 on center relative to the vertical alignment of frame 90 with support rod 84, when nut 88 is engaged at final assembly to the lower end 86 of rod 84.

Many of the parts described as used in the prior art embodiment are also used in the improved embodiment 76. This is exemplified by isolator members 38 and 40, spring 62, washer 52 and 60 as well as cup washer 64 which all can be adapted for use with hanger 76 as is, or with slight alteration.

Thus, either using isolator 38 or an equivalent, herein designated by the reference number 100, it is shown in FIGS. 3 and 4 that similar to isolator 30 that isolator 100 is fitted to hole 102 in the upper face of frame 90 by a coaxial lip 104. A seat 106 within isolator 100 is made to receive metal washer 108 which serves a bearing surface for the upper end of spring 110. Cup washer 112 supports the lower end of spring 110 and in turn rests on cross member 114. Cross member 114 has a center hole 116, as does cup washer 112, to engage lip 118 of isolator 120. Seat 122 is made to receive washer 124 on the lower face of isolator 120. Nut 88 is used to engage the threaded end 86 of rod 84 at final assembly.

To accomplish what might aptly be termed a preliminary, or at the factory, prestressing arrangement within a spring suspension 78, there is provided a pair of bolts 126 and 128 which are made to pass through holes 130 in cross member 114 on opposite sides of spring 112 with its assembly fittings, i.e., isolator 100, washer 108 and cup washer 112. Bolts 126 and 128 at their upper ends are further passed through aligned holes 132 in the top section of frame 90 where these ends are engaged by nuts 134. Tightening of nuts 134 are effective in compressing spring 110 to the desired stress level which can be calibrated relative to a stress scale 136. As in the case of the prior art hanger 10, prestressing can be done initially and adjusted at the factory or at the job site, or done entirely at the job site.

In either case, after the preliminary prestressing using bolts 126 and 128, additional prestressing is contemplated resulting from the threaded adjustment of only the single nut 88. Not only is this a greatly simplified procedure, but what is perhaps most important and what is the inventive advance over the operating mode of the prior art hanger 10, the threaded adjustment of nut 88 about the lower end 86 of the support rod 84 does not produce nor does it entail any vertical movement in the supported pipe 82. This is in contrast to the operating mode previously described in connection with the prior art hanger 10 wherein threaded adjustment of nut 74 about rod 16 urges this rod through descending movement to compress spring 62, and this descending rod movement is, as an unavoidable consequence, also movement in which the load 12 also partakes because of the attachment of the load 12 to the lower end of rod 16. While the movement of load 12 as just described is usually slight, it is nevertheless an undesirable occurrence that adversely affects the horizontal orientation that is required for the supported pipe 12.

As shown in FIG. 3, hanger 76 will be understood to be in its condition in which additional prestressing of spring 110 has been achieved by threaded adjustment of nut 88 about rod 86, which further compresses spring 110 beyond that produced by the bolts 126, 128 and their nuts 134. This additional prestressing causes no movement in the load 82, but with respect to the heads of the bolts 126 and 128, which in FIG. 3 are partially hidden, causes ascending movement of cross member 114 so that the bolt heads are in the clearance position from the cross member 114 illustrated. Bolts 126 and 128 may be removed to avoid any noise or vibration therein which may bypass the vibration and noise-absorbing isolators 100 and 120.

While spring suspension 78 of hanger 76 is intended primarily for the horizontal suspension of water pipes, it need not be limited to the support of such loads but can readily be adapted to the fitting of flanges or straps of equipment to be supported.

One such alternate arrangement is shown in FIG. 5 where clevis 80 along with bolt 94, nut 95 and spacer sleeves 98 are replaced with a pair of brackets 138, a through bolt 140, a nut 142 and a sleeve 144 to engage a load support flange 146 or the like.

Further refitting of hanger 76 is shown in FIG. 6 where a yoke 148 is mounted on frame 90 by the use of through bolt 150, sleeve 152 and nut 154 to support load 156.

While the particular pipe hanger and support herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A hanger for horizontally supporting a pipe at spaced locations therealong comprising at said locations an inverted U-shaped frame connected to support the pipe at the lower end thereof, a vertically oriented support rod disposed centrally of said frame, a helical spring disposed about said support rod within said frame, the first end of said spring resting in an elastomeric dampening member mounted to said frame and passing said mounting rod therethrough, a horizontally oriented spring-compressing member disposed in said frame in supporting relation beneath said spring and with a depending end of said support rod in projected relation therebelow, the depending end of said support rod passing through a second elastomeric dampening member, a first nut engaging said plate through said second elastomeric dampening member, a first removable spring-compressing means in the form of cooperating nuts and bolts on opposite sides of said spring operatively arranged upon threaded adjustment of said nuts to cause ascending movement in said spring-compressing member to correspondingly cause a prestressing of said spring, and a second spring compressing means formed by said first nut being in threaded engagement on said support rod depending end so as to cause additional ascending movement in said spring-compressing member without movement of said frame to additionally prestress said spring, whereby the partaking of said spring-compressing member of said ascending movements is not accompanied by any vertical movements of said supported pipe.

2. A hanger as claimed in claim 1 including an elastomeric member disposed on said support rod between said spring-compressing member and said nut to contribute to absorbing any vibration in the hanger.

3. A hanger as claimed in claim 1 including an upwardly facing U-shaped clevis attachment in facing relation to said downwardly facing inverted U-shaped frame, to thereby bound therebetween an operative area for disposing said spring and said supported pipe.

* * * * *